US011326921B2

(12) United States Patent
Nagase et al.

(10) Patent No.: US 11,326,921 B2
(45) Date of Patent: May 10, 2022

(54) FLOW RATE MEASURING METHOD AND FLOW RATE MEASURING DEVICE

(71) Applicant: FUJIKIN INCORPORATED, Osaka (JP)

(72) Inventors: Masaaki Nagase, Osaka (JP); Yohei Sawada, Osaka (JP); Kouji Nishino, Osaka (JP); Nobukazu Ikeda, Osaka (JP)

(73) Assignee: FUJIKIN INCORPORATED, Osaka (JP)

( * ) Notice: Subject to any disclaimer, the term of this patent is extended or adjusted under 35 U.S.C. 154(b) by 513 days.

(21) Appl. No.: 16/483,518

(22) PCT Filed: Feb. 8, 2018

(86) PCT No.: PCT/JP2018/004325
§ 371 (c)(1),
(2) Date: Aug. 5, 2019

(87) PCT Pub. No.: WO2018/147354
PCT Pub. Date: Aug. 16, 2018

(65) Prior Publication Data
US 2020/0011720 A1    Jan. 9, 2020

(30) Foreign Application Priority Data
Feb. 10, 2017  (JP) .............................. JP2017-023575

(51) Int. Cl.
*G01F 3/38*        (2006.01)
*G01F 5/00*        (2006.01)
(Continued)

(52) U.S. Cl.
CPC ............... *G01F 3/38* (2013.01); *G01K 13/00* (2013.01); *G01L 19/00* (2013.01); *G05D 7/0641* (2013.01)

(58) Field of Classification Search
CPC ... G01F 15/00; G01F 1/00; G01F 1/10; G01F 1/28; G01F 15/063; G01F 1/6842;
(Continued)

(56) References Cited

U.S. PATENT DOCUMENTS 9,163,969 B2 * 10/2015 Sawada ................ G01F 15/046
10,890,475 B2 * 1/2021 Shakudo ................ G01F 7/005
(Continued)

FOREIGN PATENT DOCUMENTS

CN        108496064 B  *  5/2020  ............... G01F 1/34
JP        2006337346 A     12/2006
(Continued)

OTHER PUBLICATIONS

International Search Report issued in PCT/JP2018/004325; dated Apr. 10, 2018.

*Primary Examiner* — Andre J Allen
(74) *Attorney, Agent, or Firm* — Studebaker & Brackett PC

(57) ABSTRACT

The flow rate measuring method is performed in a common gas supply system comprising a plurality of gas supply paths each having a first valve, and a gas measuring device formed downstream side of the plurality of gas supply paths, having a pressure sensor, a temperature sensor, and a downstream side second valve. The flow rate measuring method includes: a first step of opening any one of the first valves and the second valve to allow gas to flow, closing the second valve while gas is flowing, and closing the first valve after a predetermined time has elapsed, and then measuring a pressure and a temperature after the first valve has been closed; a second step of opening any one of first valves and the second valve to allow gas to flow, closing the any one of the first valve and the second valve at the same time while gas is flowing, and then measuring a pressure and temperature after the first valve and the second valve have been
(Continued)

closed; and a third step of calculating the flow rate in accordance with the pressure and temperature measured in the first step and the pressure and temperature measured in the second step.

10 Claims, 6 Drawing Sheets

(51) Int. Cl.
*G05D 7/00* (2006.01)
*G01K 13/00* (2021.01)
*G01L 19/00* (2006.01)
*G05D 7/06* (2006.01)

(58) Field of Classification Search
CPC . G01F 5/00; G01F 1/684; G01F 1/115; G01F 9/006; G01F 15/005; G01F 15/0755; G01F 1/34; G01F 15/18; G01F 1/002; G01F 1/22; G01F 15/12; G01F 1/06; G01F 1/36; G01F 15/028; G01F 15/06; G01F 1/66; G01F 1/68; G01F 15/14; G01F 1/075; G01F 1/662; G01F 1/72; G01F 15/024; G01F 15/075; G01F 3/38; G01F 1/74; G01F 15/003; G01F 15/068; G01F 3/12; G01F 1/40; G01F 15/001; G01F 15/02; G01F 15/185; G01F 3/18; G01F 15/125; G01F 1/56; G01F 1/58; G01F 15/007; G01F 15/065; G01F 15/07; G01F 3/16; G01F 1/696; G01F 9/001; G01F 1/007; G01F 1/053; G01F 1/20; G01F 1/37; G01F 1/64; G01F 1/6845; G01F 13/001; G01F 13/008; G01F 15/04; G01F 15/08; G01F 3/10; G01F 3/20; G01F 9/026; G01F 1/12; G01F 1/42; G01F 1/46; G01F 1/667; G01F 1/698; G01F 13/00; G01F 15/061; G01F 25/10; G01F 1/05; G01F 1/07; G01F 1/08; G01F 1/11; G01F 1/24; G01F 1/32; G01F 1/3209; G01F 1/38; G01F 1/386; G01F 1/44; G01F 1/48; G01F 1/52; G01F 1/582; G01F 1/60; G01F 1/663; G01F 1/6847; G01F 1/692; G01F 1/6965; G01F 1/704; G01F 1/76; G01F 1/8413; G01F 1/8431; G01F 1/8477; G01F 15/008; G01F 15/066; G01F 22/00; G01F 23/00; G01F 23/14; G01F 23/18; G01F 23/284; G01F 25/0092; G01F 3/065; G01F 3/22; G01F 7/00; G01F 9/008; G01F 1/103; G01F 1/125; G01F 1/206; G01F 1/363; G01F 1/69; G01F 1/78; G01F 23/28; G01F 23/804; G01F 5/005; G01F 9/023; G01F 1/005; G01F 1/106; G01F 1/1155; G01F 1/26; G01F 1/30; G01F 1/3227; G01F 1/372; G01F 1/584; G01F 1/588; G01F 1/6888; G01F 1/6986; G01F 1/699; G01F 1/84; G01F 1/8409; G01F 1/8418; G01F 1/8436; G01F 1/8486; G01F 1/849; G01F 1/8495; G01F 1/86; G01F 11/04; G01F 11/08; G01F 11/24; G01F 11/28; G01F 15/022; G01F 15/046; G01F 15/10; G01F 17/00; G01F 22/02; G01F 23/04; G01F 23/168; G01F 23/263; G01F 23/296; G01F 25/00; G01F 25/17; G01F 3/14; G01F 3/225; G01F 3/227; G01F 3/26; G01F 3/28; G01F 3/30; G01F 7/005; G01F 1/056; G01F 1/3287; G01F 1/90; G01F 11/284; G01F 15/043; G01F 23/20; G01F 23/268; G01F 23/80; G01F 23/802; G01F 25/11; G01F 25/13; G01F 25/15; G01F 9/00; G01F 9/003
USPC .................................................. 73/198
See application file for complete search history.

(56) References Cited

U.S. PATENT DOCUMENTS

| 2014/0230911 | A1* | 8/2014 | Hirata | G01F 1/6965 |
| | | | | 137/486 |
| 2017/0167026 | A1* | 6/2017 | Nakada | C23C 16/45561 |
| 2019/0301912 | A1* | 10/2019 | Miyoshi | G01F 1/34 |
| 2020/0159257 | A1* | 5/2020 | Yamashita | G01F 15/005 |

FOREIGN PATENT DOCUMENTS

| JP | 2012032983 | A |   | 2/2012 | | |
| JP | 2021144030 | A | * | 9/2021 | ......... | G01F 25/0007 |
| WO | WO-2019208417 | A1 | * | 10/2019 | ............... | G05D 7/06 |
| WO | WO-2020004183 | A1 | * | 1/2020 | ............... | G01F 1/34 |
| WO | WO-2020026784 | A1 | * | 2/2020 | ............... | G01F 1/34 |

* cited by examiner (a)

(b)

(a)

(b)

FLOW RATE MEASURING METHOD AND FLOW RATE MEASURING DEVICE

TECHNICAL FIELD

The present invention relates to a flow rate measuring method and a flow rate measuring device.

BACKGROUND OF INVENTION

A gas supply system provided in a semiconductor manufacturing apparatus or the like is generally configured to switch and supply various types of gas to a gas use target such as a process chamber via a flow rate control device provided for each supply gas type.

Further, in the operation of the flow rate control device, it is desired to check the accuracy of the flow rate and perform flow rate calibration at any time. As a flow rate measuring method, a build-up method is sometimes used for checking the accuracy of the flow rate and performing flow rate calibration.

In the build-up method, the flow rate Q can be calculated from, for example, Q=22.4 ($\Delta P/\Delta t$)×V/RT (R is a gas constant) by flowing a gas through a predetermined reference volume (V) provided downstream of the flow rate control device, and measuring the rate of rise in the pressure ($\Delta P/\Delta t$) and the temperature (T).

Patent Document 1 describes an example of flow rate measurement by the build-up method. In the gas supply device described in Patent Document 1, a flow path from an on/off valve on the downstream side of a flow rate control device, connected to each gas supply line, to an on/off valve provided in a common gas supply path is used as a reference volume (build-up volume). The flow rate is measured based on a pressure rise rate in this flow path.

Patent Document 2 discloses a calibration method of a flow rate control device by a build-up method, in which a downstream valve is closed to build-up, then an upstream valve is also closed, and the pressure and the temperature are measured after a predetermined period of time has elapsed when the temperature of the gas in the tank is decreased.

PRIOR ART PATENT LITERATURE

Patent Documents

Patent Document 1: Japanese Unexamined Patent Application Publication No. 2006-337346
Patent Document 2: Japanese Unexamined Patent Application Publication No. 2012-32983

SUMMARY OF INVENTION

Problems to be Solved

However, in the conventional build-up method, it has been found by the present inventors that highly accurate measurement may not be performed depending on the gas supply path.

The present invention has been made in view of the above-mentioned problems, and a main object thereof is to provide a flow rate measuring method and a flow rate measuring device for performing flow rate measurement on a plurality of gas supply paths with high accuracy.

Means for Solving Problem

A flow rate measuring method according to an embodiment of the present invention is performed in a gas supply system having a common gas supply path including a pressure sensor, a temperature sensor, and a flow rate measuring device having a second valve on the downstream side thereof, wherein the common gas supply path is formed by merging a plurality of gas supply paths including a flow rate control device and a first valve on the downstream side thereof on the downstream side of the plurality of gas supply paths. The method comprises a first step of opening any one of the first valves and the second valve to allow gas to flow, closing the second valve in a state where gas is flowing, closing the first valve after a predetermined time has elapsed from the second valve has been closed, and then measuring a pressure and a temperature after the first valve has been closed using the pressure sensor and the temperature sensor; a second step of opening the one of the first valves and the second valve to allow gas to flow, closing the any one of the first valves and the second valve at the same time in a state where gas is flowing, and then measuring a pressure and temperature after the first valve and the second valve have been closed using the pressure sensor and the temperature sensor; and a third step of calculating a flow rate in accordance with the pressure and temperature measured in the first step and the pressure and temperature measured in the second step.

In one embodiment, the third step uses the pressure $P_1$ and temperature $T_1$ measured in the first step and the pressure Pc and temperature Tc measured in the second step to calculate a flow rate Q according to $Q=22.4 \cdot Vs \cdot (P_1/T_1-P_c/T_c)/(R \cdot \Delta t)$ (where Vs is a build-up volume, R is a gas constant, $\Delta t$ is the predetermined time from closing the second valve to closing the first valve in the first step).

A flow rate measuring method according to an embodiment of the present invention is performed in a gas supply system comprising a common gas supply path including a pressure sensor, a temperature sensor, and a flow rate measuring device having a second valve on the downstream side thereof, wherein the common gas supply path is formed by merging a plurality of gas supply paths including a flow rate control device and a first valve on the downstream side thereof on the downstream side of the plurality of gas supply paths. The flow rate measuring method comprises: a first step of opening any one of the first valves and the second valve to allow gas to flow, closing the second valve in a state where gas is flowing, closing the second valve after a first predetermined time has elapsed, and then measuring a pressure and a temperature after the first valve has been closed using the pressure sensor and the temperature sensor; a second step of opening the first valve and the second valve to allow gas to flow, closing the second valve in a state where gas is flowing, closing the first valve after a second predetermined time shorter than the first predetermined time has elapsed from the second valve has been closed, and then measuring a pressure and temperature after the first valve has been closed using the pressure sensor and the temperature sensor; and a third step of calculating a flow rate in accordance with the pressure and temperature measured in the first step and the pressure and temperature measured in the second step.

In one embodiment, the plurality of gas supply paths are connected to either a first gas supply line or a second gas supply line, and the first gas supply line and the second gas supply line merged together and are connected to the common gas supply line.

In one embodiment, at least one of the plurality of gas supply paths has a different pipe diameter than other gas supply paths.

In one embodiment, the flow rate control device is a pressure-type flow rate control device including a control valve, a restriction part, and a pressure sensor that measures a pressure upstream of the restriction part.

A flow rate measuring device according to an embodiment of the present invention is a flow rate measuring device connected to a common gas supply path in a gas supply system comprising a plurality of gas supply paths having a flow rate control device and a first valve on the downstream side thereof and the common gas supply path formed by merging the plurality of gas supply paths on the downstream side of the plurality of gas supply paths, wherein the flow rate measuring device includes a pressure sensor and a temperature sensor provided to the common gas supply path, a second valve provided to the downstream side of the pressure sensor and the temperature sensor, and an arithmetic control device receiving an output of the pressure sensor and the temperature sensor. In the arithmetic and control unit, opening any one of the first valves and the second valve to allow gas to flow, then closing the second valve while gas is flowing, after a predetermined time has elapsed from the second valve has been closed, closing the any one of the first valves, the pressure and temperature after the first valve has been closed are received as the first pressure and the first temperature from the pressure sensor and the temperature sensor; opening any one of the first valves and the second valve to allow gas to flow, then closing the any one of the first valves and the second valve at the same time while gas is flowing, and the pressure and temperature after the first valve and the second valve have been closed are received as the second pressure and the second temperature from the pressure sensor and the temperature sensor; and a flow rate is calculated according to the first pressure, the first temperature, the second pressure, and the second temperature.

Effect of Invention

According to the embodiments of the present invention, even when a plurality of gas supply paths is provided, line dependency can be reduced and flow rate can be measured with high accuracy.

BRIEF DESCRIPTION OF DRAWINGS

FIG. 5 is a schematic diagram showing a gas supply system used for the measurement in the graph shown in FIG. 4, wherein FIG. 5(a) shows a case where the pressure measurement of the first line is performed, and FIG. 5(b) shows a case where the pressure measurement of the second line is performed.

DETAILED DESCRIPTION OF EMBODIMENTS

Embodiments of the present invention will be described below with reference to the drawings, but the present invention is not limited to the following embodiments.

Figure 1:
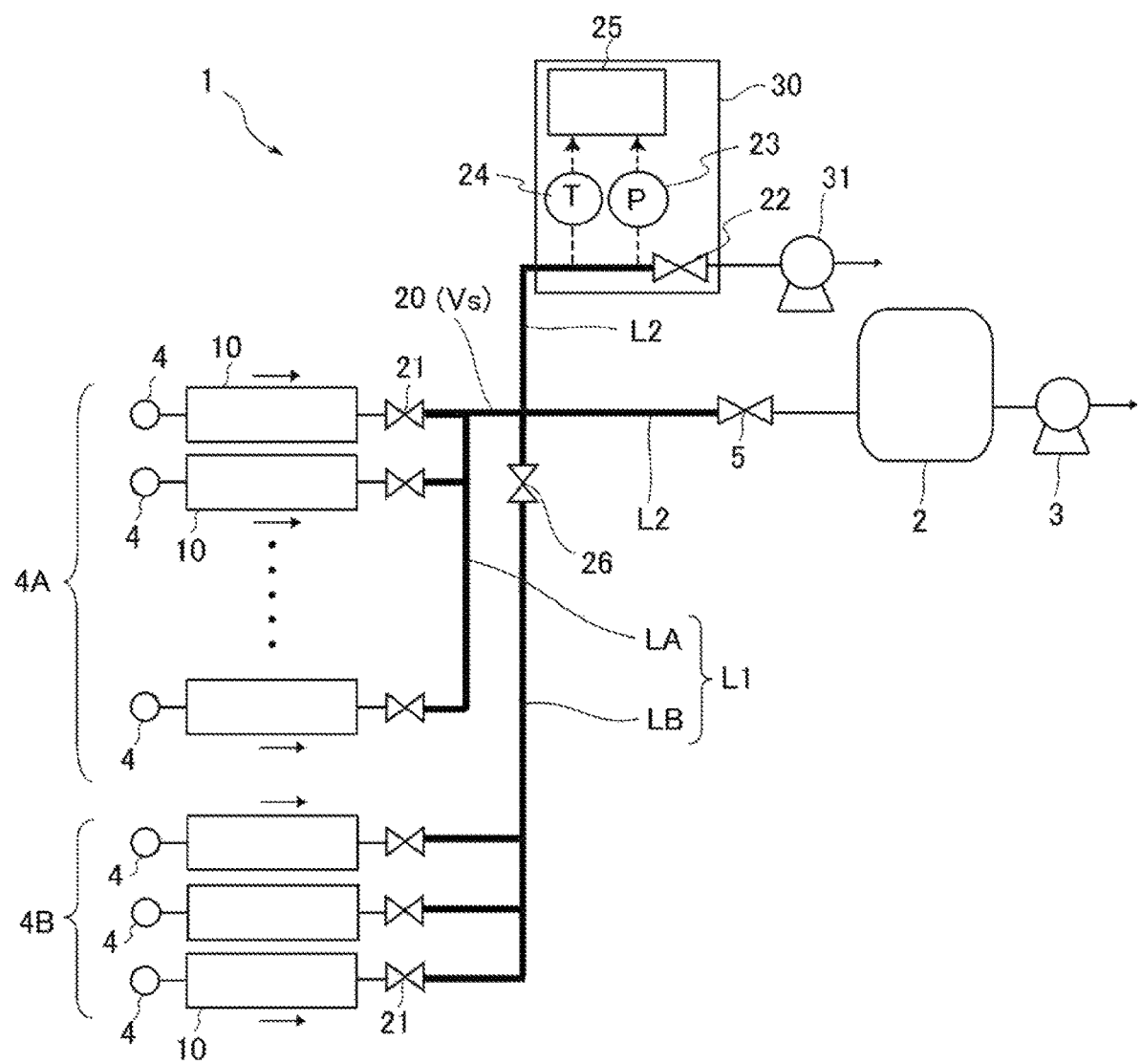
FIG. 1 is a schematic diagram showing a gas supply system wherein a flow rate measuring device according to an embodiment of the present invention is incorporated.

FIG. 1 shows a gas supply system 1 according to an embodiment of the present invention, in which gas from a plurality of gas supply sources 4 can be supplied to a process chamber 2 of a semiconductor manufacturing apparatus at a controlled flow rate via a flow rate control device 10 provided for each gas supply source 4.

The gas supply system 1 includes a plurality of gas supply lines L1 to which a plurality of gas supply sources 4 are connectable, a flow rate control device 10 interposed in each gas supply line L1, a first valve 21 installed downstream of each flow rate control device 10, and a common gas supply line L2 formed by merging the gas supply lines L1.

In the present embodiment, the gas supply source 4 is divided into a first gas supply source 4A and a second gas supply source 4B, and the plurality of gas supply sources 4 constituting the first gas supply source 4A are commonly connected to the first gas supply line LA (hereinafter, sometimes referred to as the first line LA), the plurality of gas supply sources 4 constituting the second gas supply source 4B are commonly connected to the second gas supply line LB (hereinafter, sometimes referred to as the second line LB). The first line LA and the second line LB are merged and connected to the downstream-side common gas supply line L2.

Both the first line LA and the second line LB are used to supply a desired gas to the process chamber 2. However, the first line LA and the second line LB may differ, for example, in the inner diameter and length of the tube. These lines are often individually designed to suit the purpose of each gas supply.

The common gas supply line L2 is provided with a flow rate measuring device 30. The flow rate measuring device 30 is provided with a second valve 22, a pressure sensor 23 and a temperature sensor 24 for measuring the pressure and temperature of the flow path between the first valve 21 and the second valve 22, and an arithmetic and control unit 25 for receiving outputs from the pressure sensor 23 and the temperature sensor 24. The pressure sensor 23 and the temperature sensor 24 are provided upstream and in the vicinity of the second valve 22 and the downstream side of the flow rate measuring device 30 is connected to a vacuum pump 31 so that the upstream side of the second valve 22 can be exhausted.

Although the flow rate measuring device 30 of the present embodiment shown in FIG. 1 is arranged branched from the gas supply line connected to the process chamber 2, in other embodiments it may be arranged so as to be interposed in the middle of the gas flow path connecting the gas supply source 4 and the process chamber 2. In this specification, any flow path through which gas from both the first line LA and the second line LB may be flow referred to herein as a common gas supply line L2, and the flow rate measuring device 30 may be arranged in various manners as long as it is provided so as to communicate with both the first line LA and the second line LB.

The arithmetic and control unit 25 of the flow rate measuring device 30 may be provided integrally with the pressure sensor 23, the temperature sensor 24, and the second valve 22, or may be a processing device provided externally, and the arithmetic and control unit 25 typically includes a CPU, a memory (storage device) M such as a ROM or a RAM, an A/D converter, and the like, and may include a computer program configured to execute a flow rate measuring operation described later, and may be realized by a combination of hardware and software.

The arithmetic and control unit 25 may be provided with an interface for exchanging information with an external device configuration such as a computer, so that programs and data can be written from an external device to the ROM. The components of the arithmetic and control unit 25 (such as the CPU) need not all be provided integrally in the device, but some components such as the CPU may be arranged in another place (outside the device) and connected to each other by a bus. In this case, the inside of the device and the outside of the device may communicate through wire as well as wirelessly.

The downstream side of the gas supply system 1 is connected to the process chamber 2 via a downstream valve 5. A vacuum pump 3 is connected to the process chamber 2, and the process chamber 2, the gas supply paths L1, L2, and the like can be evacuated as necessary. Instead of using the above-mentioned vacuum pump 31, the downstream side of the flow rate measuring device 30 may be commonly connected to the vacuum pump 3 on the downstream side of the process chamber 2.

The gas supply line L1 and the common-gas supply line L2 may be provided with other branched gas lines or other valves. The first valve 21 and the second valve 22 are preferably on/off valves (shut-off valves), for example, fluid-operated valves such as AOVs (Air Operated Valve) or electrically operated valves such as solenoid valves and motorized valves. In other embodiments, the first valve 21 may be an on/off valve built into the flow rate control device 10.

Figure 2:
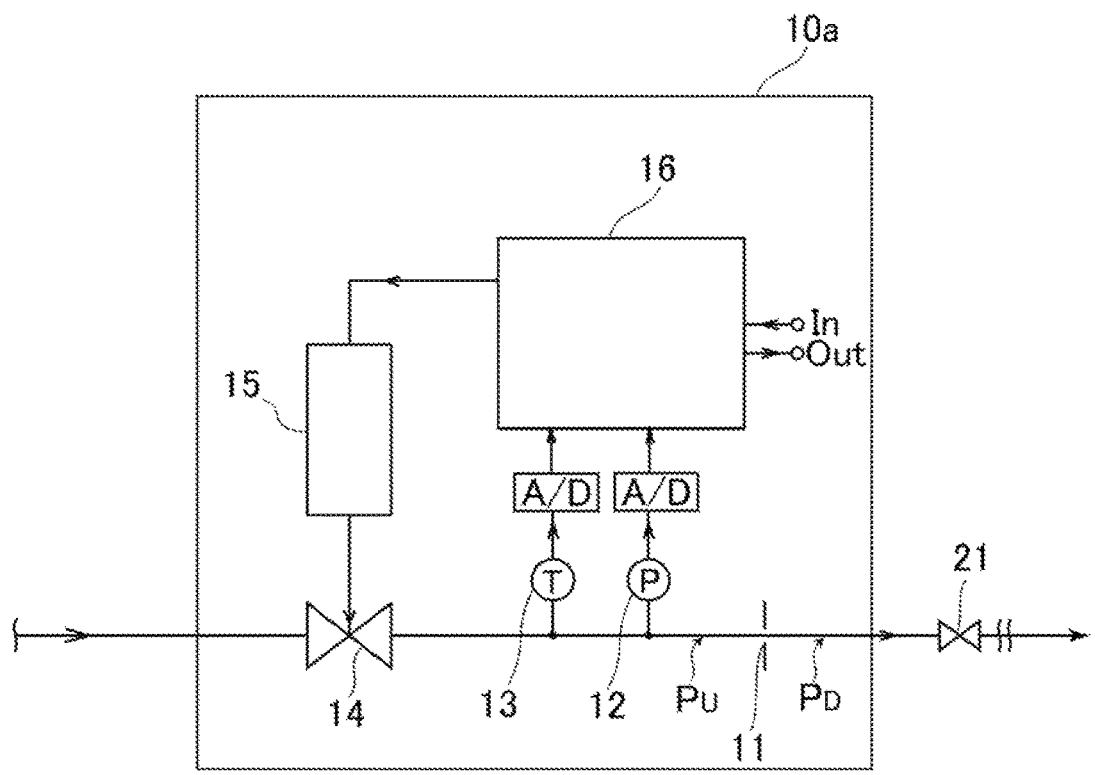
FIG. 2 is a diagram showing an exemplary configuration of a pressure-type flow rate control device used in an embodiment of the present invention.

FIG. 2 is a diagram showing a configuration example of a pressure-type flow rate control device 10*a* used as the flow rate control device 10 of the present embodiment. The pressure-type flow rate control device 10*a* includes a restriction part 11 (for example, an orifice plate) 11 having a fine opening (orifice), a control valve 14 and a drive portion 15 of the control valve 14 provided upstream of the restriction part 11, and a pressure sensor 12 and a temperature sensor 13 provided between the restriction part 11 and the control valve 14. As the restriction part 11, a critical nozzle or a sonic nozzle other than the orifice member may be used. The diameter of the orifice or the nozzle is set to, for example, 10 μm to 500 μm.

The pressure sensor 12 and the temperature sensor 13 are connected to a control circuit 16 via an AD converter. The control circuit 16 is also connected to the drive unit 15 of the control valve 14, and generates a control signal according to outputs of the pressure sensor 12 and the temperature sensor 13, and controls the operation of the control valve 14 by this control signal. In this embodiment, the control circuit 16 is provided in each pressure-type flow rate control device 10*a*, but in other embodiments, the control circuit 16 common to a plurality of pressure-type flow rate control devices 10*a* may be provided outside the flow rate control devices.

The pressure-type flow rate control device 10*a* may have a conventional configuration, and the flow rate can be controlled in accordance with the measurement result of the upstream pressure $P_U$ using the pressure sensor 12. In other embodiments, the pressure-type flow rate control device 10*a* may also include a pressure sensor downstream of the restriction part 11, and may be configured to measure the flow rate based on the upstream pressure $P_U$ and the downstream pressure $P_D$. In addition, the flow rate control device used as the flow rate control device 10 is not limited to such type of pressure-type flow rate control device, and may be, for example, a thermal type flow rate control device or other flow rate control device.

In the pressure-type flow rate control device 10*a*, the flow rate is controlled by the principle that: when the critical expansion condition $P_U/P_D \geq$ about 2 ($P_U$: gas pressure on the upstream side of the restriction part (upstream pressure), $P_D$: gas pressure on the downstream side of the restriction part (downstream pressure), and about 2 is for nitrogen gas), the flow rate of the gas passing through the restriction part is fixed to the speed of sound, and the flow rate is determined by the upstream pressure $P_U$ regardless of the downstream pressure $P_D$. When the critical expansion condition is satisfied, the flow rate Q downstream of the restriction part is given by $Q=K_1 \cdot P_U$ ($K_1$ is a constant depending on the type of fluid and the fluid temperature), the flow rate Q is proportional to the upstream pressure $P_U$, and when a downstream pressure sensor is provided, the flow rate can be calculated even if the difference between the upstream pressure $P_U$ and the downstream pressure $P_D$ is small and the critical expansion condition is not satisfied, and the flow rate Q can be calculated from a predetermined equation $Q=K_2 \cdot P_D^m (P_U-P_D)^n$ (where $K_2$ is a constant depending on the type of fluid and the fluid temperature, and m, n is an index derived from the actual flow) based on the upstream pressure $P_U$ and the downstream pressure $P_D$ measured by each pressure sensor.

In order to perform flow rate control, a set flow rate is input to the control circuit 16, and the control circuit 16 obtains a flow rate by calculation from the above $Q=K_1 \cdot P_U$ or $Q=K_2 \cdot P_D^m (P_U-P_D)^n$ according to an output (upstream pressure $P_U$) of the pressure sensor 12 or the like, and feedback-controls the control valve 14 so that the flow rate approaches the input set flow rate. The flow rate obtained by the calculation may be displayed as a flow rate output value.

Referring again to FIG. 1, in the gas supply system 1, the flow rate can be measured by the build-up method using a flow path (a portion indicated by a thick line in FIG. 1) between the first valve 21 and the second valve 22 as a reference volume (build-up volume) 20 (volume: Vs), and the flow rate control device 10 can be calibrated in accordance with the flow rate measurement result by the build-up method.

The flow rate control characteristic of the flow rate control device 10 may change after being incorporated in the gas supply system 1, or the relationship between the upstream pressure and the flow rate may change due to a change in the shape of the restriction part caused by aging, whereas in the gas supply system 1 of the present embodiment, the flow rate can be accurately measured at an arbitrary timing even after being incorporated in the gas supply system 1 by the build-up method using the flow rate measuring device 30, so that the accuracy of the flow rate control device 10 can be ensured.

In the present embodiment, the reference volume 20 includes both the first line LA and the second line LB. In the illustrated example, an on/off valve 26 is provided in the second line LB, but the on/off valve 26 is opened when the flow rate is measured, and both the first line LA and the second line LB are used as the reference volume 20. Therefore, the size of the reference volume 20 is set the same in both the flow rate measurement in the first line LA and the flow rate measurement in the second line LB. Thus, in the present embodiment, since a part of the flow path is used as the reference flow rate (build-up volume) and a build-up tank as described in Patent Document 2 is not used, the advantage of downsizing the flow rate measurement device 30 and performing the flow rate measurement in a short time can be achieved.

However, according to the present inventors, it has been found that the flow rate measurement in the supply line included in the first line LA and the flow rate measurement in the supply line included in the second line LB may be different in the measurement accuracy even when the flow rate measurement by the build-up method is performed under the same conditions.

Figure 3:
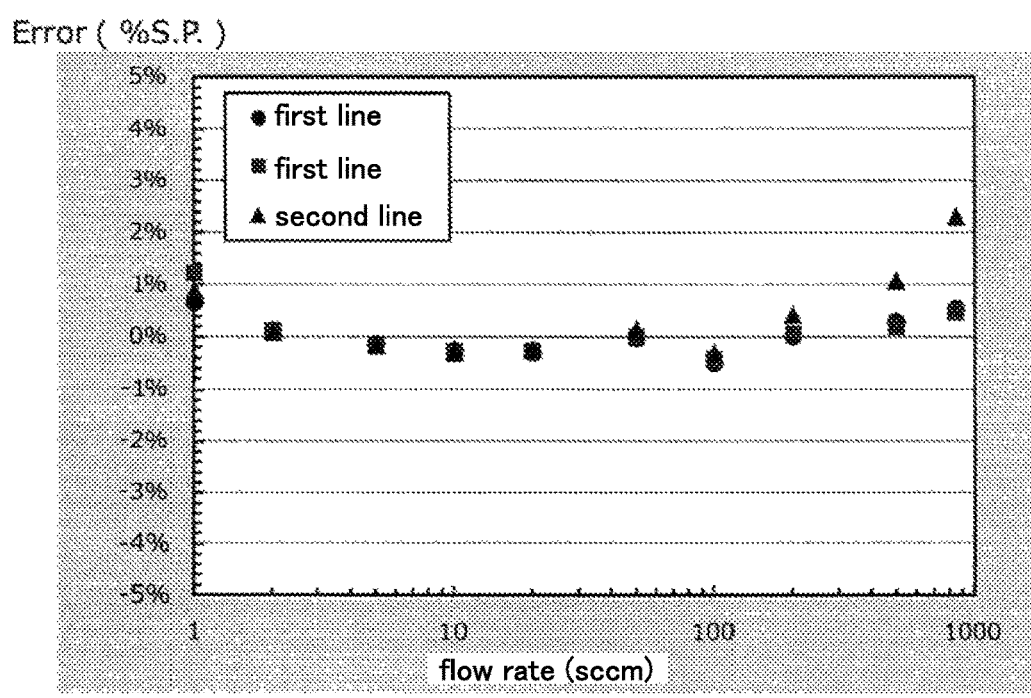
FIG. 3 is a graph showing an error from a reference flow rate when the flow rate is measured by the conventional build-up method, and shows the results for a first line and a second line respectively.

FIG. 3 shows the magnitude of an error (set point error: % S.P.) of the build-up measured flow rate relative to the reference flow rate (the exact flow rate measured using the reference instrument) detected in each of two first lines LA and one second line LB.

As can be seen from FIG. 3, in the second line LB, especially at a large flow rate of 200 sccm or more, the error from the reference flow rate is larger than that in the case of the first line LA. This may be caused by the magnitude of the pressure loss when the gas flows differs between the first line LA and the second line LB due to the difference in tube diameter, etc., therefore the magnitude of the measurement error differs between the lines even when the flow rate is measured based on the gas pressure using the same build-up method.

Therefore, in order to reduce the line dependency of such a measurement error, in the present embodiment, the flow rate measurement is performed by correcting the amount to be obtained by the build-up method based on the amount of gas (gas pressure) in each line measured in a state where the flow of gas does not occur (gas sealed state), whereby the actual flow rate of gas flowing in at the time of build-up can be more accurately obtained, and more accurate flow rate measurement can be performed.

Figure 4:
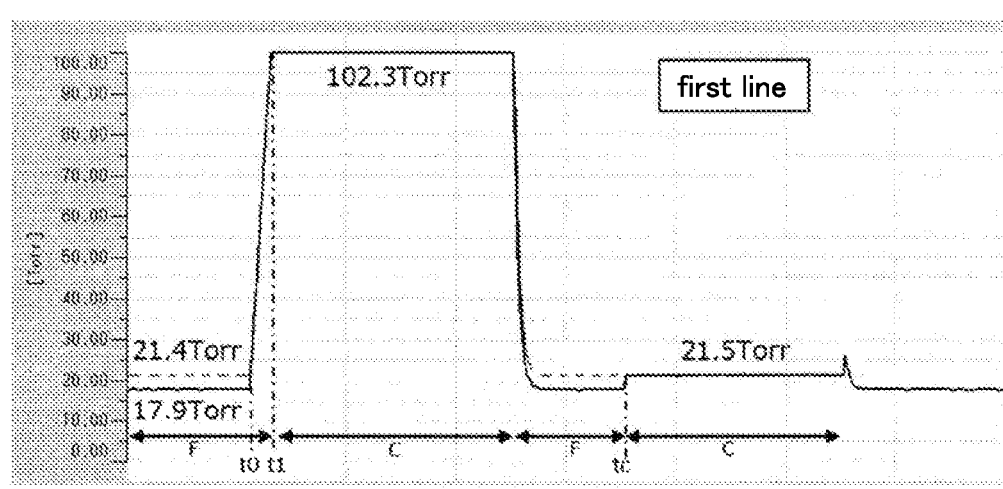
FIG. 4(a) shows a pressure measurement result in line 1.
FIG. 4(b) shows the pressure measurement result in line 2.
Figure 4:
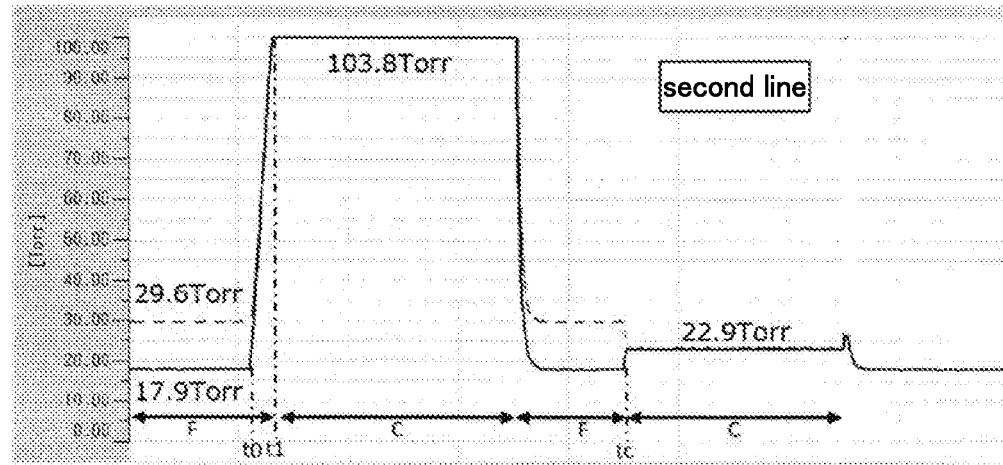
Figure 5:
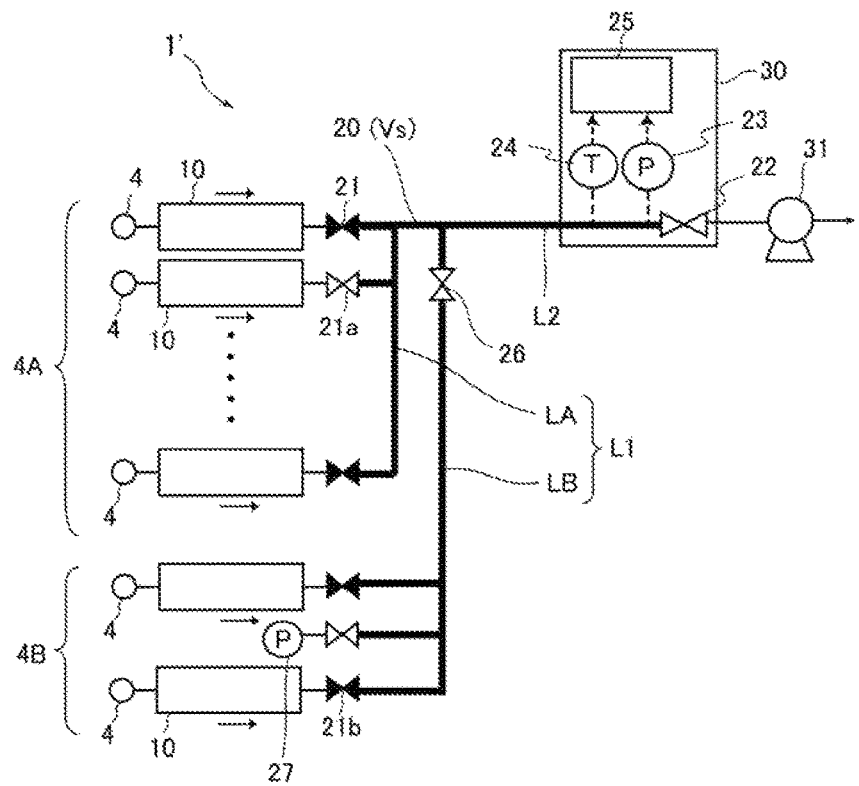
Figure 5:
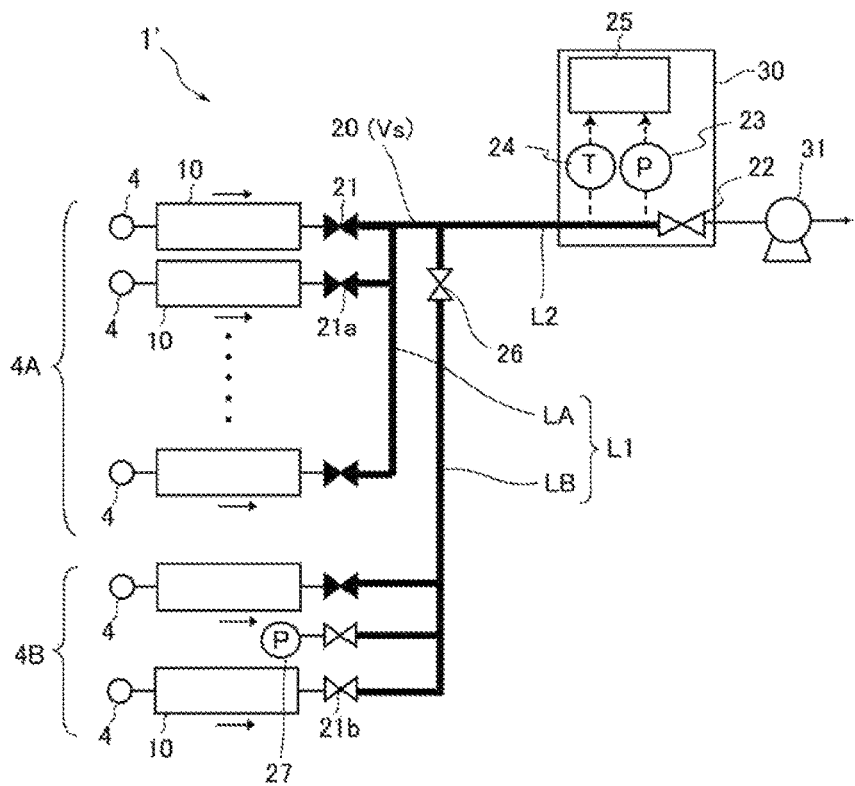

FIGS. 4(a) and 4(b) are diagrams showing the pressure change by the build-up method in the first line LA and the second line LB, and the pressure in the gas sealing state due to the simultaneous closing of the valves, respectively. The gas flow period F and the gas sealing period C are also shown, and the horizontal axis represents 1 scale of 5 seconds. For reference, FIGS. 4(a) and 4(b) also show the measurement result of the gas pressure upstream of the flow rate measuring device 30, when a pressure sensor 27 (see FIG. 5) is provided instead of the gas supply source 4 and the flow rate control device 10 in one of the second lines LB in broken lines.

FIGS. 5(a) and (b) show the gas supply system 1' used to obtain the graphs shown in FIGS. 4(a) and (b): in FIGS. 5(a) and (b), the valve shown in white is open and the valve shown in black is closed.

As shown in FIG. 5(a), when the pressure change of the first line LA is measured, the first valve 21a of the second supply path in the first line LA is selectively opened, and the pressure measurement is performed from the state in which the gas is constantly flowing in the selected line, and as shown in FIG. 5(b), when the pressure change of the second line LB is measured, the pressure measurement is performed from the state in which the first valve 21b of the third supply path in the second line LB is selectively opened, for example.

As can be seen by comparing FIG. 4(a) and FIG. 4(b), when the same gas flow rate of 500 sccm (here, nitrogen gas) is supplied in a steady flow, the measured pressures by the flow rate measuring device 30 are equal (17.9 Torr) in the first line LA and the second line LB, while the gas pressure upstream of the flow rate measuring device 30 (the pressure measured by the pressure sensor 27) is 21.4 Torr in the first line LA, but bigger as 29.6 Torr in the second line LB. From this point, it is possible to judge that the pressure loss is larger in the second line LB, and the difference in the pressure loss may be attributed, for example, to the fact that the pipe diameter of the second line LB is smaller than the pipe diameter of the first line LA.

The pressure rise (build-up) is generated by closing the second valve 22 of the flow rate measuring device 30 at time t0 from the gas steady flow state. In the conventional build-up method, the flow rate may be calculated on the basis of the pressure rise rate ($\Delta P/\Delta t$) at this time. However, as shown in FIG. 3, the line dependency may occur and the error may become large particularly in the second line LB.

Thereafter, at time $t_1$, when the first valve 21 is closed, the inflow of the gas stops, so that the pressure is maintained at a substantially constant value after rising, and from this state, when the first valve 21 and the second valve 22 are opened, the gas flows out again, and the gas pressure in the sealed space drops to the pressure at the time of the gas steady flow state.

In the present embodiment, in addition to the measurement of the pressure rise after the closing of the second valve 22 based on the build-up method described above, the pressure when the first valve 21 and the second valve 22 are simultaneously closed and brought into the sealed state from the gas stable supply state (that is, from the state shown in FIG. 5(a), after the first valve 21a and the second valve 22 are simultaneously closed) is also measured by the flow rate measuring device.

As can be seen from FIGS. 4(a) and 4(b), the pressure measured in the sealed condition after the first valve 21 and the second valve 22 are simultaneously closed at the time tc is higher in the second line LB (22.9 Torr) than in the first line LA (21.5 Torr).

Since this pressure difference can be considered to correspond to the line dependence of the gas flow rate in the steady flow state, the line dependence can be reduced by subtracting the steady-state gas flow rate corresponding to the pressure in the sealed state from the increased gas flow rate introduced by the build-up method.

More specifically, in the build-up method, the number n1 of moles of the gas after the build-up is obtained from $n_1 = P_1 Vs/RT_1$ and the number $n_c$ of moles of the gas in the sealed state is obtained from $n_c = P_c Vs/RT_c$, and the number $\Delta n = n_1 - n_c = (P_1 Vs/RT_1) - (P_c Vs/RT_c) = Vs/R \cdot (P_1/T_1 - P_c/T_c)$ of moles of the gas actually flowed in is obtained, where $P_1$ and $T_1$ are the pressure and temperature at the time t1 when the first valve 21 is closed after the build-up and the gas inflow is stopped (or the time when the predetermined time elapses while the sealed state after the time t1 is maintained), $P_c$ and $T_c$ are the pressure and temperature in the sealed state after the first valve 21 and the second valve 22 are simultaneously closed, and R is the gas constant.

Since the flow rate Q is the volume of gas flowing in per unit time, the gas flow rate Q (sccm) can be obtained from $Q = 22.4 \cdot \Delta n/\Delta t = 22.4 \cdot Vs \cdot (P_1/T_1 - Pc/Tc)/(R \cdot \Delta t)$, where $\Delta t$ is the time period from the time point t0 when the second valve 22 is closed and the build-up is started to the time point t1 when the first valve 21 is closed and the gas inflow is stopped.

In the above description, the step of measuring the pressure and the temperature of the gas after the build-up (first step) is followed by the step of measuring the pressure and the temperature after the first valve and the second valve are closed simultaneously (second step), but the order of performing the first step and the second step may be reversed.

Figure 6:
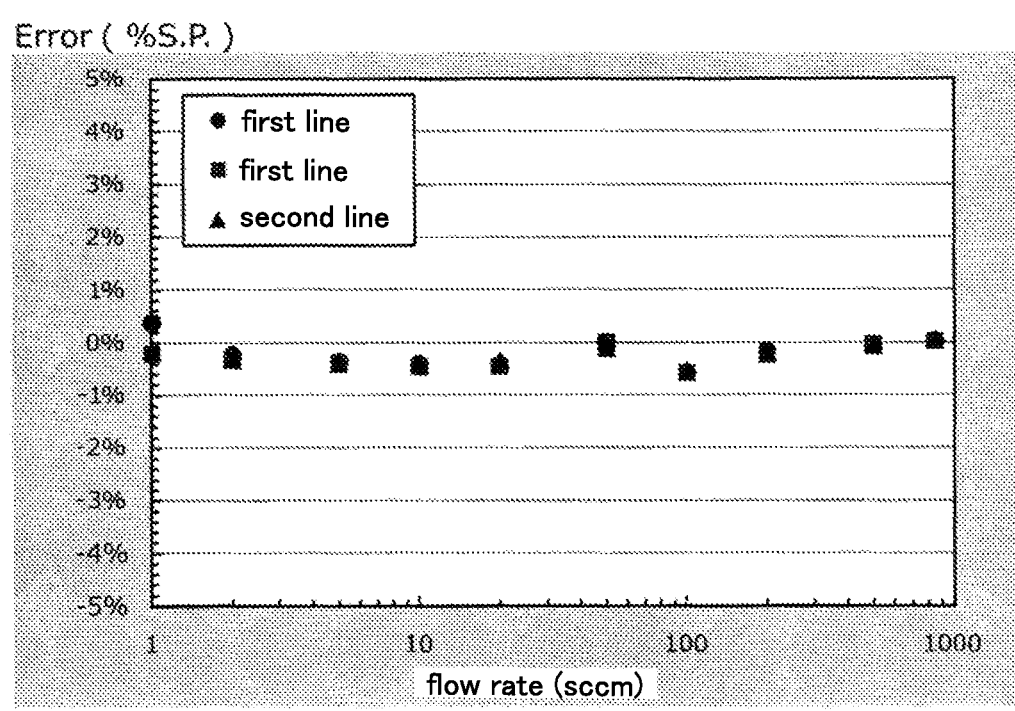
FIG. 6 is a graph showing an error from a reference flow rate when the flow rate is measured by the line-dependent corrected build-up method in an embodiment of the present invention, and shows results for the first line and the second line respectively.

FIG. 6 shows the magnitude of the error in the measured flow rate by the build-up method with respect to the reference flow rate detected in each of the two first lines LA and one second line LB using the method of this embodiment. As can be seen from FIG. 5, the flow rate measurement is performed accurately over a wide range of flow rates regardless of the first line LA and the second line LB. As can be seen from FIG. 3, the measurement error is reduced in both lines LA and LB even at a particularly large flow rate (200 sccm or more).

As in the case of the gas supply system 1 shown in FIG. 1, when the downstream-side flow path of the flow rate control device 10 is used as the reference volume 20, it may be preferable to measure the volume Vs of the reference volume 20 after the gas supply system 1 is constructed by connecting a plurality of flow rate control devices 10 by piping or the like. For example, the volume Vs of the reference volume 20 can be obtained based on Qs=($\Delta P/\Delta t$)× (Vs/RT) by measuring the rate of change in pressure after the second valve 22 is closed while the gas is flowing through the reference volume 20 at the set flow rate Qs. The volume Vs of the reference volume 20 can be measured by various methods known in the prior art (for example, Patent Document 1).

Figure 7:
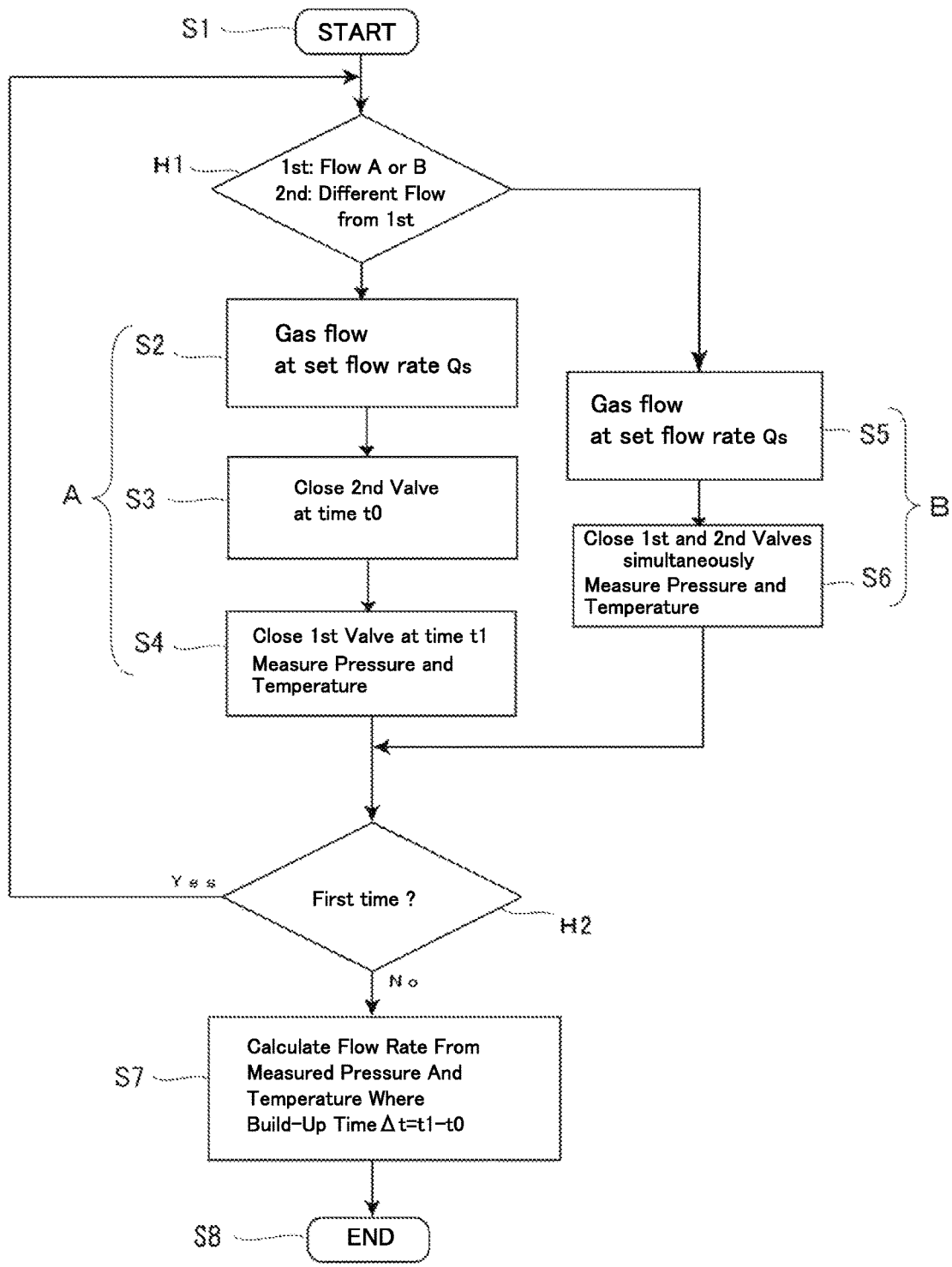
FIG. 7 is a flowchart showing a measurement procedure in the flow rate measuring method according to a embodiment of the present invention.

Hereinafter, a specific example of the flow rate measuring method according to the embodiment will be described with reference to the flowchart shown in FIG. 7.

First, as shown in step S1, the flow rate measurement is started in the gas supply system 1 to which the flow measurement device 30 is connected. Then, in the judgment step H1, the flow proceeds to any one of the following flow A and flow B, and, as will be described later, after the one flow is finished in the decision step H2, the flow returns to the judgment step H1, and the unexecuted flow differently from the first time is executed in the second time.

More specifically, as shown in steps S2-S4, the measurement flow of pressure rise (flow A or first step) is performed, and the gas seal measurement flow (flow B or second step) shown in steps S5-S6 is also performed; flow B may be performed after flow A, or may be performed in advance before flow A, and is optionally determined in judgment step H1.

First, in step S2 of flow A, the flow rate control device 10 of the flow path for measuring the flow rate is set to the set flow rate Qs, the corresponding first valve 21 and the second valve 22 of the flow rate measuring device 30 are opened to flow the gas at the set flow rate Qs. At this time, the on/off valve 26 provided in the second line LB is also opened.

Next, as shown in step S3, the second valve 22 provided in the flow rate measuring device 30 is closed at time t0 when the gas is flowing at the set flow rate Qs (when the gas flow is stabilized), the pressure P0 of the reference volume 20 may be measured using the pressure sensor 23 provided in the flow rate measuring device 30, and the temperature T0 may be measured by the temperature sensor 24.

Thereafter, as shown in step S4, the first valve 21 is closed at time t1 to terminate the build-up. Time t1 is the time after a predetermined time has elapsed from the time t0, for example, when the output of the pressure sensor 23 reaches a predetermined pressure. The pressure P1 after the build-up is measured by the pressure sensor 23 using the flow rate measuring device 30, and the temperature T1 is measured by the temperature sensor 24, and at this time, $\Delta t=t1-t0$ is also detected as the build-up time. The build-up time $\Delta t$ is set to, for example, 2 to 20 seconds.

It may be desirable to measure the pressure P1 and the temperature T1 in a sealed state after the build-up, with the inflow of gas being stopped, because the temperature may be temporarily increased due to the influence of adiabatic compression immediately after the first valve 21 is closed, and therefore, by measuring the pressure P1 and the temperature T1 after the build-up in a gas stable state after a predetermined time elapses after the first valve 21 is closed, the flow rate can be detected with higher accuracy.

In flow B, as shown in step S5, the flow rate control device 10 of the flow path for measuring the flow rate is set to the same set flow rate Qs as that of flow A, the corresponding first valve 21 and the second valve 22 of the flow rate measuring device 30 are opened, and the gas is flowed at the set flow rate Qs.

Next, as shown in step S6, the first valve 21 and the second valve 22 are closed simultaneously or substantially simultaneously from the state in which the gas flows at the set flow rate Qs, and the pressure Pc and the temperature Tc are measured by the flow rate measuring device 30 in the gas sealed state after being closed simultaneously.

In step S6, the operation of simultaneously closing the first valve 21 and the second valve 22 is preferably performed by simultaneously giving a closing command to the first valve 21 and the second valve 22. Although in actual configurations the first valve 21 and the second valve 22 may not be fully closed simultaneously, since the valve may be closed later than the closing command if the valve is composed of, for example, an AOV. However, the pressure measurement in the sealed state may be performed with the first valve 21 and the second valve 22 substantially simultaneously closed, so the closing timing of the first valve 21 and the second valve 22 may be slightly deviated, and is described herein as "closed simultaneously" including when the closing timing of the first valve 21 and the second valve 22 is slightly deviated by such an error range.

After flow A or flow B is performed, it is determined whether both flow A and flow B are completed in the decision step H2, and if they are completed, the process proceeds to the step S7. However, if it is determined in the decision step H2 that only one flow is performed, the process returns to the decision step H1 to perform the other flow.

After both flows A and B are completed, in step S7, the flow rate is calculated using the measured pressure and temperature obtained in step S4 and the measured pressure and temperature obtained in step S6. As the volume Vs of the reference volume used in the flow rate calculation, the volume Vs obtained using the specific flow rate setting Qs in which the error from the reference value is reduced may be used.

The flow rate Q measured as described above may be used for comparison verification with the flow rate setting Qs of the flow rate control device 10, and calibration of the flow rate setting Qs of an arbitrary flow rate control device 10 may be performed in accordance with the flow rate Q obtained by the build-up method described above.

While the embodiments of the present invention have been described above, various modifications are possible. For example, it is described that the pressure and the temperature are measured when the first valve 21 and the second valve 22 are closed simultaneously or substantially simultaneously from the state in which the gas is flowing, but the pressure and the temperature may be measured after the first valve 21 is closed after a predetermined time $\Delta t'$ has elapsed from the closing of the second valve 22. And in this case, in the same manner as in the case of flow B, the pressure rises within the reference volume corresponding to the predetermined time Δt', as in the case of flow A.

However, the predetermined time Δt' in flow B is set to be shorter than the build-up time Δt in flow A, for example, half or less. The flow rate calculation can calculate Δn=n−n' by subtracting the gas amount n' obtained in flow B from the gas amount n obtained in flow A, and calculate the flow rate by calculating the inflow time Δt−Δt'. Also in this case, the line dependence of the gas flow rate in the steady flow state can be reduced, and more accurate flow rate measurement can be performed.

INDUSTRIAL APPLICABILITY

According to the flow rate measuring method according to the embodiment of the present invention, the flow rate can be accurately measured for a plurality of gas supply paths even after being incorporated in the gas supply system.

DESCRIPTION OF NUMERICALS

1 Gas supply system
2 Process chamber
3 Vacuum-pump
4 Gas supply source
10 Flow rate control device
11 Restriction part
12 Pressure sensor
13 Temperature sensor
14 Control valve
15 Drive
16 Controlling circuit
20 Reference volume (build-up volume)
21 First valve
22 Second valve
23 Pressure sensor
24 Temperature sensor
25 Arithmetic control unit
30 Flow rate measuring device

The invention claimed is:

1. A flow rate measuring method performed in a gas supply system comprising: a plurality of gas supply paths each having a flow rate control device and a first valve downstream of the flow rate control device; a common gas supply path formed by merging the plurality of gas supply paths on the downstream side of the plurality of gas supply paths, and provided with a flow rate measuring device having a pressure sensor, a temperature sensor, and a second valve on the downstream side thereof;
the flow rate measuring method comprising:
a first step of opening any one of first valves and the second valve to allow gas to flow, closing the second valve in a state where gas is flowing, closing the first valve after a predetermined time has elapsed from the second valve has been closed and then measuring a pressure and a temperature after the first valve has been closed using the pressure sensor and the temperature sensor;
a second step of opening the one of first valves and the second valve to allow gas to flow, closing the one of the first valves and the second valve at the same time in a state where gas is flowing, and then measuring a pressure and temperature after the first valve and the second valve have been closed using the pressure sensor and the temperature sensor;
a third step of calculating a flow rate in accordance with the pressure and temperature measured in the first step and the pressure and temperature measured in the second step.

2. The flow rate measuring method according to claim 1, wherein the third step comprises calculating a flow rate Q according to $Q=22.4 \cdot V_s \cdot (P_1/T_1 - P_c/T_c)/(R \cdot \Delta t)$ (where $V_s$ is a build-up volume, R is a gas constant, $\Delta t$ is the predetermined time from closing the second valve to closing the first valve in the first step) using the pressure $P_1$ and the temperature $T_1$ measured in the first step and the pressure $P_c$ and the temperature $T_c$ measured in the second step.

3. A flow rate measuring method performed in a gas supply system comprising: a plurality of gas supply paths each having a flow rate control device and a first valve downstream of the flow rate control device; a common gas supply path formed by merging the plurality of gas supply paths on the downstream side of the plurality of gas supply paths, and provided with a flow rate measuring device having a pressure sensor, a temperature sensor, and a second valve on the downstream side thereof;
the flow rate measuring method comprising:
a first step of opening any one of first valves and the second valve to allow gas to flow, closing the second valve in a state where gas is flowing, closing the second valve after a first predetermined time has elapsed, and then measuring a pressure and a temperature after the first valve has been closed using the pressure sensor and the temperature sensor;
a second step of opening the first valve and the second valve to allow gas to flow, closing the second valve in a state where gas is flowing, closing the first valve after a second predetermined time shorter than the first predetermined time has elapsed from the second valve has been closed, and then measuring a pressure and temperature after the first valve has been closed using the pressure sensor and the temperature sensor;
a third step of calculating a flow rate in accordance with the pressure and temperature measured in the first step and the pressure and temperature measured in the second step.

4. The flow rate measuring method according to claim 1, wherein the plurality of gas supply paths are connected to either a first gas supply line or a second gas supply line, and the first gas supply line and the second gas supply line are merged and connected to the common gas supply line.

5. The flow rate measuring method according to claim 1, wherein at least one of the plurality of gas supply paths has a pipe diameter different from that of the other gas supply paths.

6. The flow rate measuring method according to claim 1, wherein the flow rate control device is a pressure-type flow rate control device including a control valve, a restriction part, and a pressure sensor for measuring a pressure upstream side of the restriction part.

7. A flow rate measuring device used in a gas supply system comprising a plurality of gas supply paths having a flow rate control device and a first valve on the downstream side of the flow rate control device; and a common gas supply path formed by merging the plurality of gas supply paths on the downstream side of the plurality of gas supply paths, the flow rate measuring device being connected to the common gas supply path;
the flow rate measuring device comprising:
a pressure sensor and a temperature sensor provided to the common gas supply path;

a second valve provided downstream side of the pressure sensor and the temperature sensor; and an arithmetic control unit receiving output from the pressure sensor and the temperature sensor wherein the arithmetic control unit executes the steps of:

opening any one of the first valves and the second valve to allow gas to flow, then closing the second valve while gas is flowing, after a predetermined time has elapsed from the second valve has been closed, closing the any one of the first valves, and receiving the pressure and temperature after the first valve has been closed as the first pressure and the first temperature from the pressure sensor and the temperature sensor, opening any one of the first valves and the second valve to allow gas to flow, then closing the any one of the first valves and the second valve at the same time while gas is flowing, and receiving the pressure and temperature after the first valve and the second valve have been closed as the second pressure and the second temperature from the pressure sensor and the temperature sensor, and calculating a flow rate in accordance with a first pressure, a first temperature, a second pressure, and a second temperature.

8. The flow rate measuring method according to claim 3, wherein the plurality of gas supply paths are connected to either a first gas supply line or a second gas supply line, and the first gas supply line and the second gas supply line are merged and connected to the common gas supply line.

9. The flow rate measuring method according to claim 3, wherein at least one of the plurality of gas supply paths has a pipe diameter different from that of the other gas supply paths.

10. The flow rate measuring method according to claim 3, wherein the flow rate control device is a pressure-type flow rate control device including a control valve, a restriction part, and a pressure sensor for measuring a pressure upstream side of the restriction part.

* * * * *